(12) United States Patent
Chen

(10) Patent No.: US 9,307,592 B2
(45) Date of Patent: Apr. 5, 2016

(54) CONSTANT CURRENT DRIVING DEVICE

(71) Applicant: Kuo-Tso Chen, Taipei (TW)

(72) Inventor: Kuo-Tso Chen, Taipei (TW)

(73) Assignee: Optromax Electronics Co., LTD, Hsinchu (TW)

( * ) Notice: Subject to any disclaimer, the term of this patent is extended or adjusted under 35 U.S.C. 154(b) by 0 days.

(21) Appl. No.: 14/568,069

(22) Filed: Dec. 11, 2014

(65) Prior Publication Data

US 2015/0373797 A1 Dec. 24, 2015

Related U.S. Application Data

(60) Provisional application No. 62/014,706, filed on Jun. 20, 2014.

(51) Int. Cl.
*H05B 33/08* (2006.01)
*H02M 7/10* (2006.01)

(52) U.S. Cl.
CPC ............ *H05B 33/0815* (2013.01); *H02M 7/10* (2013.01)

(58) Field of Classification Search
None
See application file for complete search history.

(56) References Cited

U.S. PATENT DOCUMENTS

| | | | | |
|---|---|---|---|---|
| 5,646,514 A * | 7/1997 | Tsunetsugu | ......... | H02M 7/2176 323/285 |
| 5,821,701 A * | 10/1998 | Teggatz | ................ | H02M 3/158 315/169.3 |
| 2001/0043451 A1 * | 11/2001 | Akiyama | ............. | A61N 1/3931 361/232 |
| 2005/0207188 A1 * | 9/2005 | Takashima | .............. | H02M 1/08 363/21.14 |
| 2006/0001381 A1 * | 1/2006 | Robinson | ........... | H05B 33/0815 315/185 R |
| 2011/0101876 A1 * | 5/2011 | Jheng | ................. | H05B 33/0815 315/201 |
| 2011/0273099 A1 * | 11/2011 | Liang | ................. | H05B 33/0812 315/186 |
| 2011/0285354 A1 * | 11/2011 | Iwasa | .................... | H02J 7/0031 320/137 |
| 2012/0139420 A1 * | 6/2012 | Lee | .................... | H05B 33/0815 315/122 |
| 2012/0300506 A1 * | 11/2012 | Lee | ................... | H02M 3/33507 363/21.13 |
| 2013/0026977 A1 * | 1/2013 | Pei | ........................ | H02J 7/0029 320/107 |
| 2013/0162150 A1 * | 6/2013 | Masuda | ............. | H05B 33/0815 315/186 |
| 2013/0187543 A1 * | 7/2013 | Chang | .................... | H02H 9/001 315/85 |
| 2013/0187555 A1 * | 7/2013 | Pan | .................... | H05B 33/0842 315/188 |
| 2013/0320857 A1 * | 12/2013 | Fu | ........................ | H05B 33/089 315/122 |
| 2013/0328492 A1 * | 12/2013 | Hsieh | ....................... | G05F 1/46 315/193 |

FOREIGN PATENT DOCUMENTS

TW M453321 5/2013

* cited by examiner

*Primary Examiner* — Crystal L Hammond
(74) *Attorney, Agent, or Firm* — Jianq Chyun IP Office

(57) ABSTRACT

A constant current driving device includes an electronic device, a transistor, a rectifying circuit, a current limiting element, an impedance element, and a first and a second energy storage element. A first end of the electronic device is connected to a first end of a load element. A first end of the transistor is connected to a second end of the load element, a second end of the transistor is connected to a second end of the electronic device through an impedance element, and a control end of the transistor is connected to the second end of the electronic device through a first energy storage element. The rectifying circuit connected between the first end and the control end of the transistor. The current limiting element is connected in parallel with the rectifying circuit. The second energy storage element is connected between the first and second end of the electronic device.

19 Claims, 4 Drawing Sheets

CONSTANT CURRENT DRIVING DEVICE

CROSS-REFERENCE TO RELATED APPLICATION

This application claims the priority benefits of U.S. provisional application Ser. No. 62/014,706, filed on Jun. 20, 2014. The entirety of the above-mentioned patent application is hereby incorporated by reference herein and made a part of this specification.

BACKGROUND OF THE INVENTION

1. Field of the Invention

The invention relates to a driving device, and more particularly, the invention relates to a constant current driving device for driving a load element.

2. Description of Related Art

Recently, products using the light-emitting diode (LED) as the light source have become more and more common in the market. When the LED is applied as the light source, slight changes to the voltage bias may significantly change the driving current of the LED, which further induces flicker and causes discomfort to the human eyes. Accordingly, manufacturers have been dedicated to the design of a constant current driving device suitable for driving the LED.

SUMMARY OF THE INVENTION

The disclosure provides a constant current driving device for driving a load element. The constant current driving device includes an electronic device, a transistor, a rectifying circuit, a current limiting element, and a second storage element. The electronic device has a first end and a second end, and the first end of the electronic device is electrically connected to a first end of a load element. The first end of the transistor is electrically connected to a second end of the load element, the second end of the transistor is electrically connected to the second end of the electronic device through an impedance element, and the control end of the transistor is electrically connected to the second end of the electronic device through a first energy storage element. The rectifying circuit is electrically connected between the first end and the control end of the transistor. The current limiting element is connected in parallel with the rectifying circuit. The second energy storage element is electrically connected between the first end and second end of the electronic device.

According to an exemplary embodiment, the constant current driving device further comprises a current dividing element electrically connected between the control end of the transistor and the second end of the electronic device.

The disclosure provides a constant current driving device for driving a load element. The constant current driving device includes an electronic device, a transistor, a rectifying circuit, a current dividing element, and a second storage element. The electronic device has a first end and a second end, wherein the first end of the electronic device is electrically connected to a first end of a load element. The first end of the transistor is electrically connected to a second end of the load element, the second end of the transistor is electrically connected to the second end of the electronic device through an impedance element, and the control end of the transistor is electrically connected to the second end of the electronic device through a first energy storage element. The rectifying circuit is electrically connected between the first end and the control end of the transistor. The current dividing element is electrically connected between the control end of the transistor and the second end of the electronic device. The second energy storage element electrically connected between the first end and the second end of the electronic device.

Based on the above, in the constant current driving device according to the embodiments of the invention, a second energy storage element charges or discharges in response to a feedback mechanism. Accordingly, an impedance element can be biased at the relatively stable reference voltage, so as to stabilize the driving current of the load element serially connected to the impedance element. The power efficiency of the constant current driving device may be further enhanced by the configuration of the rectifying circuit.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DETAILED DESCRIPTION OF DISCLOSED EMBODIMENTS

Figure 1:
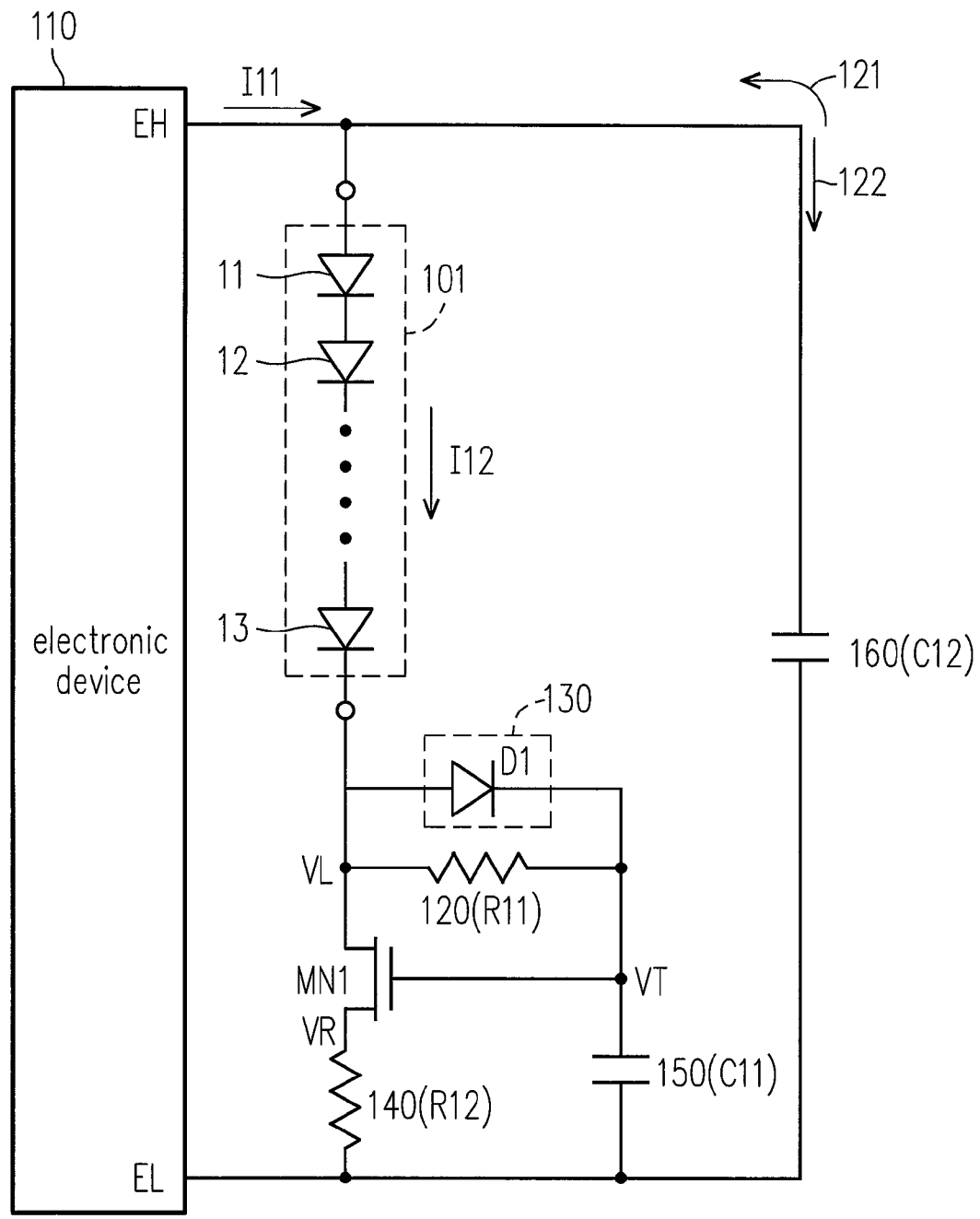
FIG. 1 is a schematic view illustrating a constant current driving device according to an embodiment of the disclosure.

FIG. 1 is a schematic view illustrating a constant current driving device according to an embodiment of the disclosure. As shown in FIG. 1, the constant current driving device is configured to drive a load element 101. The load element 101 may be a light-emitting element, and the load element 101 includes a plurality of LEDs 11 to 13 connected in series, for instance. The constant current driving device includes an electronic device 110, an n-type transistor MN1, a current limiting element 120, a rectifying circuit 130, an impedance element 140, a first energy storage element 150, and a second energy storage element 160.

The electronic device 110 has a first end and a second end. In the present embodiment, the first end of the electronic device 110 is a high voltage output end EH, and the second end of the electronic device 110 is a low voltage output end EL. The high voltage output end EH of the electronic device 110 is electrically connected to a first end of the load element 101, namely, an anode of the first LED 11. A first end of the n-type transistor MN1 is electrically connected to a second end of the load element 101, namely, a cathode of the last LED 13. A second end of the n-type transistor MN1 is electrically connected to the low voltage output end EL of the electronic device 110 through the impedance element 140. A control end of the n-type transistor MN1 is electrically connected to the low voltage output end EL of the electronic device 110 through the first energy storage element 150.

The rectifying circuit 130 is electrically connected between the first end and the control end of the n-type transistor MN1. The current limiting element 120 and the rectifying circuit 130 are connected in parallel with each other. The first energy storage element 150 is electrically connected between the control end of the n-type transistor MN1 and the low voltage output end EL of the electronic device 110, and the second energy storage element 160 is electrically connected between the high voltage output end EH and the low voltage output end EL of the electronic device 110.

As shown in FIG. 1, the n-type transistor MN1 may be an n-channel metal oxide semiconductor transistor, and the first end, the second end and the control end of the n-type transistor MN1 may be a drain, a source and a gate of the n-channel metal oxide semiconductor transistor. Besides, the current limiting element 120 may be a resistor R11, the impedance element 140 may be a resistor R12, the first energy storage element 150 may be a capacitor C11, and the second energy storage element 160 may be a capacitor C12, for instance. In another embodiment, the n-type transistor MN1 may also be an NPN bipolar transistor, and the first end, the second end and the control end of the n-type transistor MN1 may be a collector, an emitter and a base of the NPN bipolar transistor.

It should be noted that, in practical applications, the resistance value of the resistor R11 is higher than the resistance value of the resistor R12, and the capacitance value of the capacitor C11 is lower than the capacitance value of the capacitor C12. Moreover, as the resistance value of the resistor R12 increases, the current that needs to be provided by the capacitor C12 decreases. Therefore, when the resistance value of the resistor R12 increases, the capacitance value that is needed for the capacitor C12 becomes smaller. That is, in practical applications, the resistance value of the resistor R12 is inversely proportional to the capacitance value of the capacitor C12. While the capacitance value of the capacitor C12 increases and the resistance value of the resistor R12 is fixed, the changing range of the limiting voltage VL will become lower than needed, but the constant current driving device can still drive the load element 101.

For illustrative and explanatory purposes, voltages on the first end, the control end, and the second end of the n-type transistor MN1 are respectively represented by a limiting voltage VL, a control voltage VT, and a reference voltage VR in the following description. The electronic device 110 may generate an output current varies with time. As shown in FIG. 1, the electronic device 110 is, for example, a rectifier, and the electronic device 110 rectify an alternating current to generate an output current I11. Moreover, the electronic device 110 outputs the output current I11 through the high voltage output end EH, so as to drive the load element 101. It should be noticed that in another embodiment, the electronic device 110 is, for example, an alternating current source or a voltage source. The n-type transistor MN1, the current limiting element 120, the impedance element 140, and the first energy storage element 150 form a feedback mechanism, and the second energy storage element 160 charges or discharges in response to the feedback mechanism, so as to stabilize a driving current I12 flowing through the load element 101.

In particular, the current limiting element 120 may be configured to delay the charging and discharging of the first energy storage element 150, such that the level of the control voltage VT may be stabilized during a period. The current limiting effects of the n-type transistor MN1 may also help stabilize the level of the reference voltage VR during the period. Thereby, the impedance element 140 can be biased at the stable reference voltage VR, so as to further stabilize the driving current I12 of the load element 101 serially connected to the impedance element 140.

As to the transient operation of the driving device, if the total charges provided by the electronic device 110 in one period are less than the total charges consumed by the load element 101 in one period, the second energy storage element 160 discharges to the load element 100 along a current direction 121. At this time, the average voltage of the second energy storage element 160 is reduced, thus leading to the decrease in the average of the limiting voltage VL. Once the average of the limiting voltage VL decreases, the control voltage VT is correspondingly reduced after several periods, such that the driving current I12 of the load element 101 is lessened. The auto feedback mechanism can automatically balance the control voltage VT. Besides, the control voltage VT is equal to the reference voltage VR plus a fixed threshold voltage of the n-type transistor MN1. Accordingly, when the control voltage VT is stable, the reference voltage VR is stable and the current flowing through the load element 101 is also stable.

By contrast, if the total charges provided by the electronic device 110 in one period are greater than the total charges consumed by the load element 101 in one period, a portion of the output current I11 is supplied to charge the second energy storage element 160 along a current direction 122. At this time, the average voltage of the second energy storage element 160 is raised, thus leading to the increase in the average of the limiting voltage VL. Therefore, the driving current I12 of the load element 101 correspondingly increases after several periods. In other words, the constant current driving device of the present embodiment automatically balances the driving current of the load element 101, such that the total charges provided by the electronic device 110 in each period can approximate the total charges consumed by the load element 101.

The rectifying circuit 130 may be further configured to enhance the power efficiency of the constant current driving device. For instance, the rectifying circuit 130 may include a diode D1. An anode of the diode D1 is electrically connected to the first end of the n-type transistor MN1, and a cathode of the diode D1 is electrically connected to the control end of the n-type transistor MN1. If the limiting voltage VL is greater than the threshold voltage of the diode D1, the diode D1 is turned on. At this time, the charging of the first energy storage element 150 can be expedited, and the average voltage level of the control voltage VT can be kept on the voltage level higher than the limiting voltage VL. As the control voltage VT can be automatically balanced by a rate of the reference voltage VR, the higher difference (VT-VL) will cause the lower limiting voltage VL. Besides, the lower limiting voltage VL will cause the lower total energy loss, and thereby the power efficiency of the constant current driving device can be further improved and the adjustment range of the resistor R12 and the capacitor C12 can be increased. Specifically, if the capacitor C12 in the second energy storage element 160 has a relatively large capacitance, the rectifying circuit 130 is able to effectively enhance the power efficiency of the constant current driving device shown in FIG. 1.

FIG. 1 exemplifies one of the several ways to implement the rectifying circuit 130, which should however not be construed as limitations to the invention. According to another embodiment, for instance, the rectifying circuit 210 shown in FIG. 2 includes a diode D2 and a Zener diode DZ2. An anode of the diode D2 is electrically connected to the first end of the n-type transistor MN1. A cathode of the Zener diode DZ2 is electrically connected to a cathode of the diode D2, and an anode of the Zener diode DZ2 is electrically connected to the control end of the n-type transistor MN1.

Figure 2:
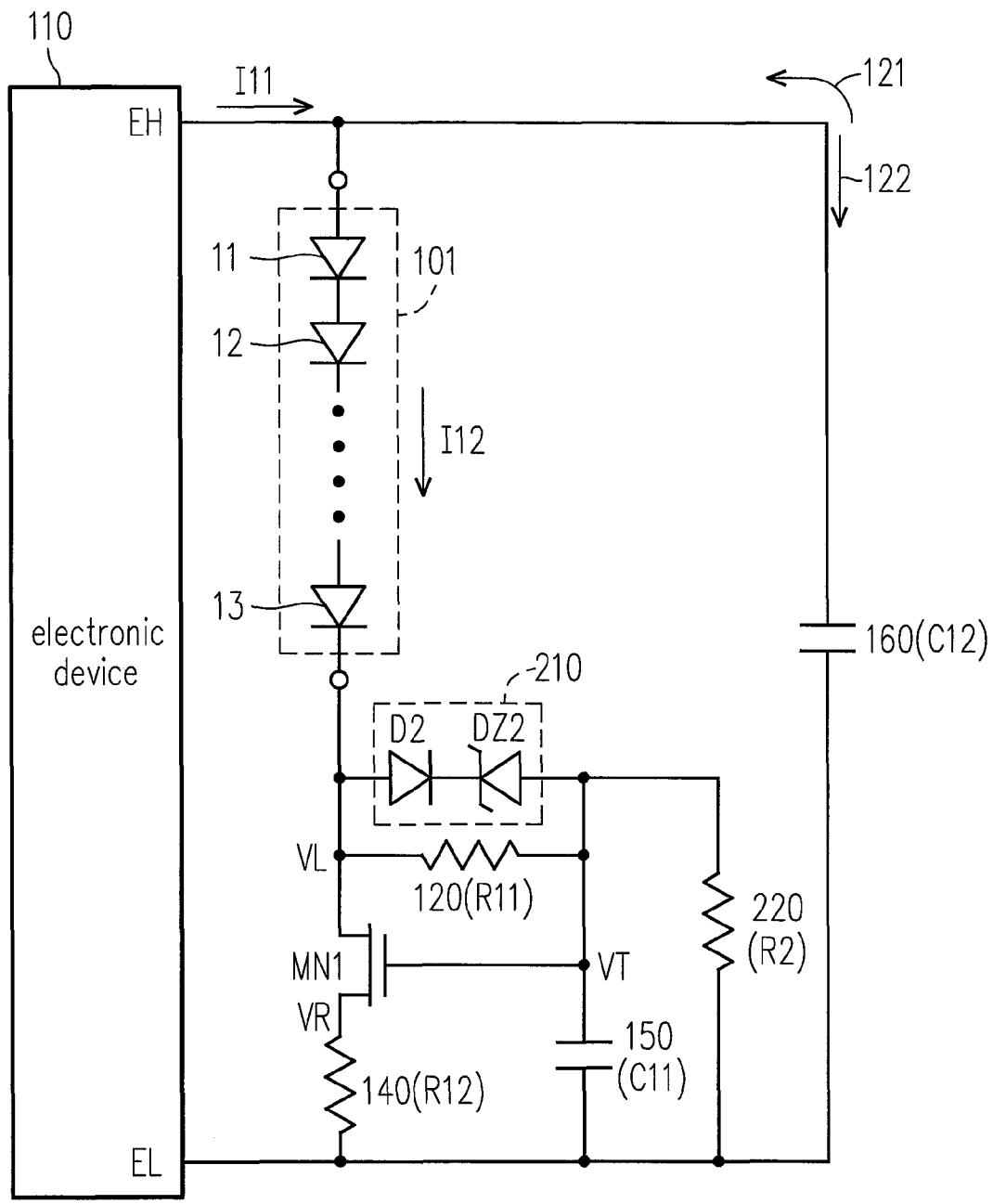
FIG. 2 is a schematic view illustrating a constant current driving device according to another embodiment of the disclosure.

Moreover, as shown in FIG. 2, the constant current driving device described in another embodiment of the disclosure further includes a current dividing element 220. The current dividing element 220 is electrically connected between the control end of the n-type transistor MN1 and the low voltage output end EL of the electronic device 110, and the current dividing element 220 may be a resistor R2, for instance. The current dividing element 220 may also be configured to increase the adjustment range of the limiting voltage VL so that the operating characteristic of the constant current driving device can be enhanced while the capacitor C12 is smaller than the predetermined value.

It should be mentioned that the current dividing element 220 is able to reduce the control voltage VT and increase the ratio of the limiting voltage VL to the control voltage VT if the capacitor C12 in the second energy storage element 160 has a relatively small capacitance, and thereby the adjustment range of the capacitor C12 to the flicker can be expanded. Besides, in another embodiment, people having ordinary skill in the art may selectively remove the current limiting element 120 according to the design requirement. In this way, the n-type transistor MN1, the rectifying circuit 210, the impedance element 140, and the first energy storage element 150 form a feedback mechanism, and the second energy storage element 160 charges or discharges in response to the feedback mechanism, so as to stabilize the driving current I12 flowing through the load element 101. Besides, the current dividing element 220 may be configured to enhance the operating characteristic of the constant current driving device.

It should be further noted that the constant current driving circuits exemplified in FIG. 1 and FIG. 2 include the n-type transistor, which should however not be construed as a limitation to the invention. People having ordinary skill in the art should be able to implement the constant current driving circuit described herein with use of a p-type transistor without departing from the scope of protection of the invention.

Figure 3:
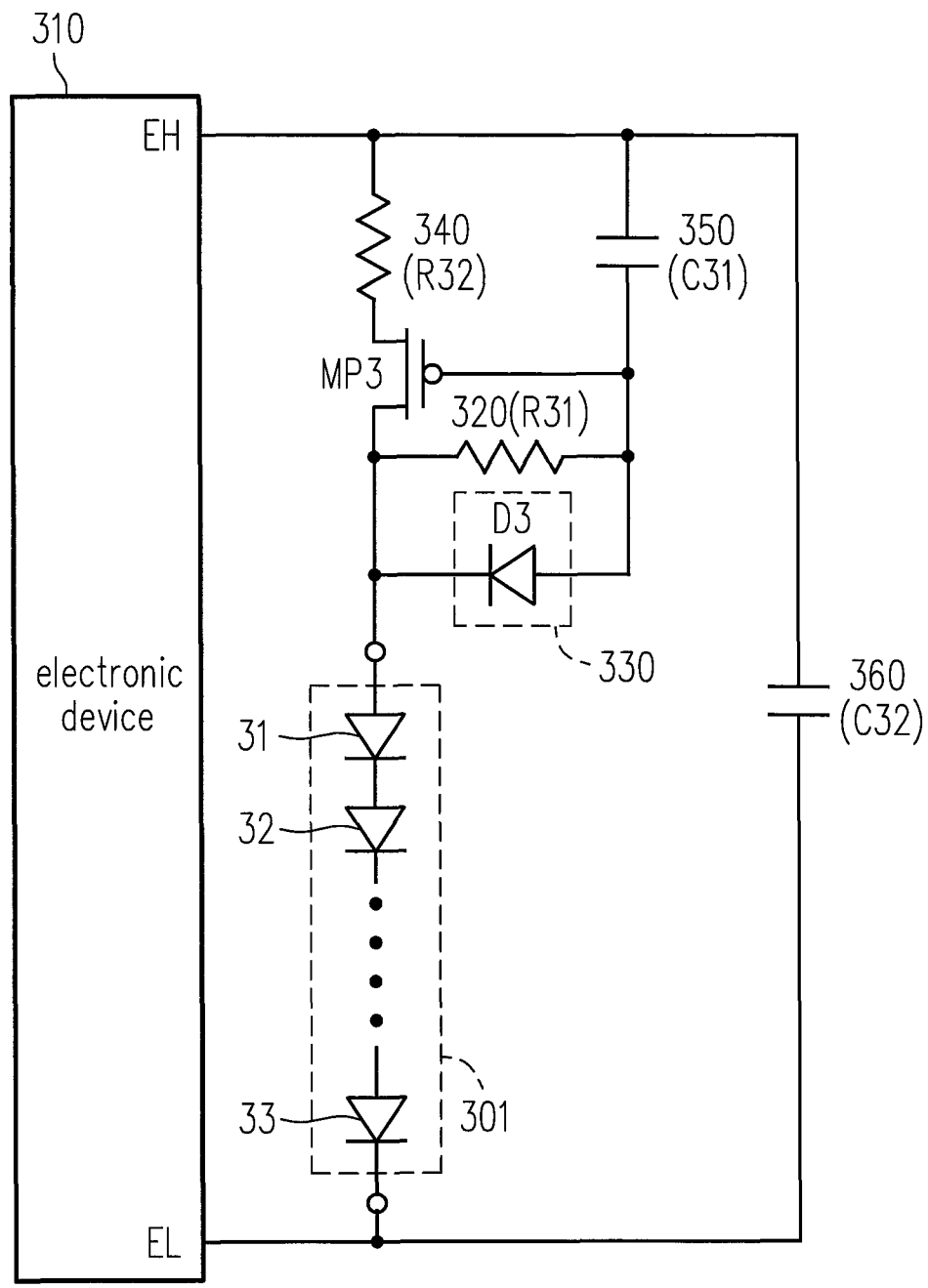
FIG. 3 is a schematic view illustrating a constant current driving device according to another embodiment of the disclosure.
Figure 4:
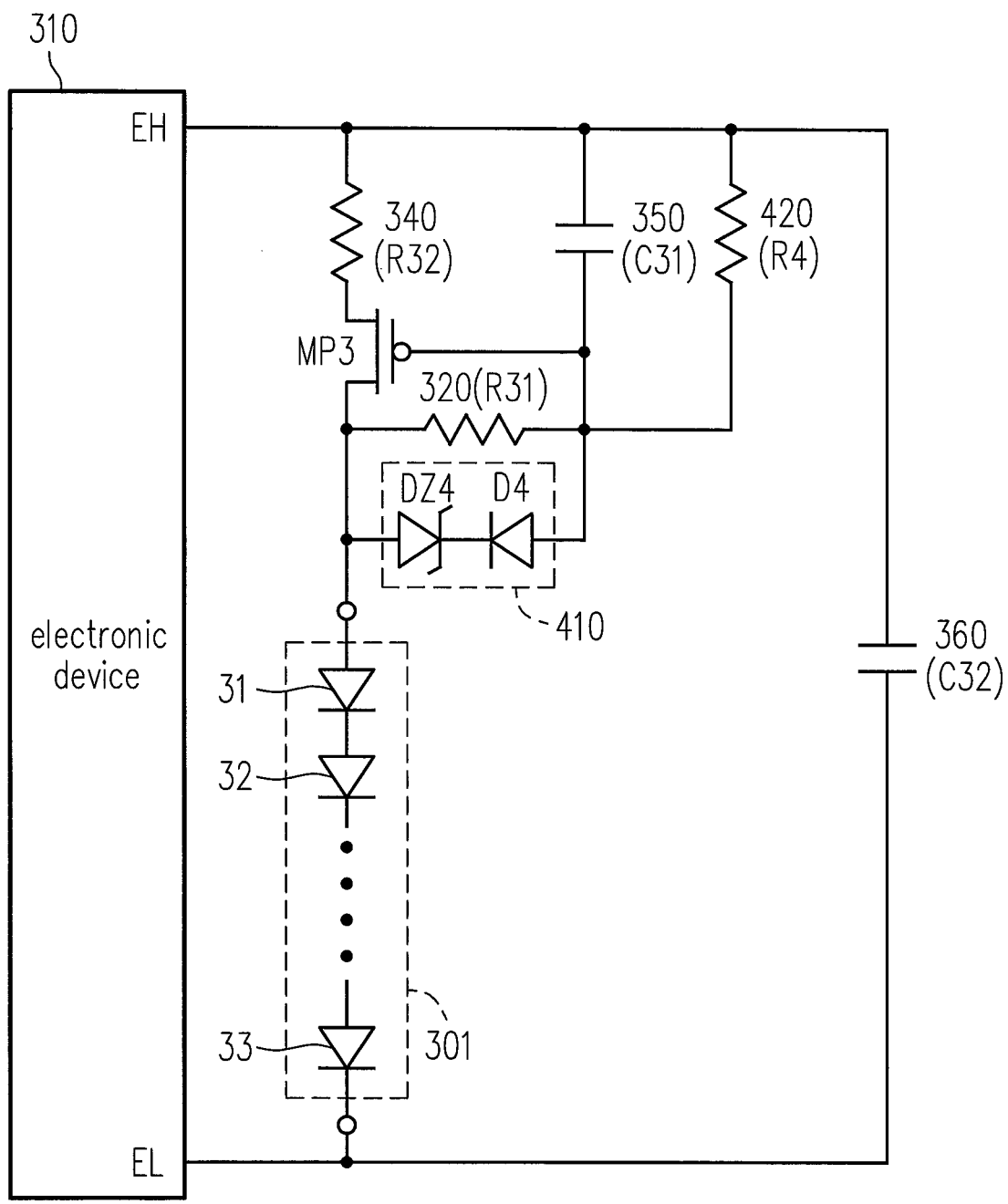
FIG. 4 is a schematic view illustrating a constant current driving device according to another embodiment of the disclosure.

For instance, FIG. 3 and FIG. 4 are schematic views respectively illustrating a constant current driving device according to another embodiment of the disclosure. As shown in FIG. 3 and FIG. 4, the constant current driving device is configured to drive a load element 301. The load element 301 may be a light-emitting element, and the load element 301 includes a plurality of LEDs 31 to 33 connected in series, for instance. Moreover, in the present embodiment, the constant current driving device includes an electronic device 310, a p-type transistor MP3, a current limiting element 320, a rectifying circuit 330, an impedance element 340, a first energy storage element 350, and a second energy storage element 360.

With reference to FIG. 1 and FIG. 3, the constant current driving device depicted in FIG. 2 may be viewed as changing the n-type transistor MN1 in FIG. 1 as a p-type transistor, and exchanging the high voltage output end HL and the low voltage output end EL of the electronic device 110 in FIG. 1.

In particular, the electronic device 310 has a first end and a second end. In the present embodiment, the first end of the electronic device 310 is a low voltage output end EL, and the second end of the electronic device 310 is a high voltage output end HL. The low voltage output end EL of the electronic device 310 is electrically connected to a first end of the load element 301, namely, a cathode of the last LED 33. A first end of the p-type transistor MP3 is electrically connected to a second end of the load element 301, namely, an anode of the first LED 31.

A second end of the p-type transistor MP3 is electrically connected to the high voltage output end HL of the electronic device 310 through the impedance element 340. A control end of the p-type transistor MP3 is electrically connected to the high voltage output end HL of the electronic device 310 through the first energy storage element 350. The rectifying circuit 330 is electrically connected between the first end and the control end of the p-type transistor MP3. The current limiting element 320 and the rectifying circuit 330 are connected in parallel with each other.

In addition, the p-type transistor MP3 may be a p-channel metal oxide semiconductor transistor, and the first end, the second end and the control end of the p-type transistor MP3 may be a drain, a source and a gate of the p-channel metal oxide semiconductor transistor. Besides, the current limiting element 320 may be a resistor R31, the impedance element 340 may be a resistor R32, the first energy storage element 350 may be a capacitor C31, and the second energy storage element 360 may be a capacitor C32, for instance. In another embodiment, the p-type transistor MP3 may also be a PNP bipolar transistor, and the first end, the second end and the control end of the p-type transistor MP3 may be a collector, an emitter and a base of the PNP bipolar transistor, for instance.

In the overall operation, the electronic device 310 generates an output current varies with time, and the electronic device 310 is, for example, a rectifier, an alternating current source or a voltage source. In addition, the p-type transistor MP3, the rectifying circuit 330, the impedance element 340, and the first energy storage element 350 form a feedback mechanism. The second energy storage element 360 charges or discharges in response to the feedback mechanism, so that the drive current flowing through the load element 301 remains stable. For example, when the charges provided by the electronic device 310 in one period are less than the charges consumed by load element 301 in one period, the second energy storage element 360 discharges to the load element 301. On the other hand, when the charges provided by the electronic device 310 in one period are greater than charge consumed by the load element 301 in one period, the second energy storage element 360 performs charging.

With reference to FIG. 3, in an embodiment of the disclosure, the rectifying circuit 330 is electrically connected between the first end and the control end of the p-type transistor MP3, and the rectifying circuit 330 includes a diode D3. A cathode of the diode D3 is electrically connected to the first end of the p-type transistor MP3, and an anode of the diode D3 is electrically connected to the control end of the p-type transistor MP3. Besides, the rectifying circuit 330 may be further configured to enhance the power efficiency of the constant current driving device.

With reference to FIG. 4, in an embodiment of the disclosure, the rectifying circuit 410 is electrically connected between the first end and the control end of the p-type transistor MP3, and the rectifying circuit 410 includes a diode D4 and a Zener diode DZ4. An anode of the diode D4 is electrically connected to the control end of the p-type transistor MP3. A cathode of the Zener diode DZ4 is electrically connected to a cathode of the diode D4, and an anode of the Zener diode DZ4 is electrically connected to the first end of the p-type transistor MP3.

As shown in FIG. 4, the constant current driving device described in an embodiment of the invention further includes a current dividing element 420. The current dividing element 420 is electrically connected between the control end of the p-type transistor MP3 and the high voltage output end EH of the electronic device 310, and the current dividing element 420 may be a resistor R4, for instance. The current dividing element 420 may also be configured to increase the adjustment range of the limiting voltage VL when the capacitance value of capacitor C32 is smaller. Besides, in another embodiment, people having ordinary skill in the art may selectively remove the current limiting element 320 according to the design requirement. Detailed description regarding the components in FIG. 3 and FIG. 4 is already provided in the description of the embodiments above, so no further details will be reiterated hereinafter.

In summary, in the constant current driving device according to the embodiments of the invention, a feedback mechanism is formed, and the second energy storage element charges or discharges in response to the feedback mechanism. Accordingly, an impedance element can be biased at the relatively stable reference voltage, so as to stabilize the driving current of the load element serially connected to the impedance element. The power efficiency of the constant current driving device may be further enhanced by the configuration of the rectifying circuit.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. A constant current driving device for driving a load element, the constant current driving device comprising:
    an electronic device having a first end and a second end, wherein the first end of the electronic device is electrically connected to a first end of the load element;
    a transistor having a first end, a second end, and a control end, wherein the first end of the transistor is electrically connected to a second end of the load element, the second end of the transistor is electrically connected to the second end of the electronic device through an impedance element, and the control end of the transistor is electrically connected to the second end of the electronic device through a first energy storage element;
    a rectifying circuit electrically connected between the first end and the control end of the transistor;
    a current limiting element connected in parallel with the rectifying circuit; and
    a second energy storage element electrically connected between the first end and the second end of the electronic device.

2. The constant current driving device according to claim 1, wherein the rectifying circuit comprises a diode connected between the first end and the control end of the transistor.

3. The constant current driving device according to claim 1, wherein the rectifying circuit comprises a diode and a Zener diode connected in series between the first end and the control end of the transistor.

4. The constant current driving device according to claim 1, further comprising a current dividing element electrically connected between the control end of the transistor and the second end of the electronic device.

5. The constant current driving device according to claim 4, wherein each of the current limiting element, the impedance element and the current dividing element is composed of a resistor.

6. The constant current driving device according to claim 1, wherein each of the first energy storage element and the second energy storage element is composed of a capacitor.

7. The constant current driving device according to claim 1, wherein the load element is a light-emitting element.

8. The constant current driving device according to claim 1, wherein the first end of the electronic device is a high voltage output end, the second end of the electronic device is a low voltage output end, the electronic device outputs an output current through the high voltage output end, and the transistor is an n-type transistor.

9. The constant current driving device according to claim 8, wherein the load element comprises:
    at least one light-emitting diode (LED), wherein an anode of the at least one LED is electrically connected to the high voltage output end of the electronic device, and a cathode of the at least one LED is electrically connected to the, first end of the n-type transistor.

10. The constant current driving device according to claim 1, wherein the first end of the electronic device is a low voltage output end, the second end of the electronic device is a high voltage output end, the electronic device outputs an output current through the high voltage output end, and the transistor is a p-type transistor.

11. The constant current driving device according to claim 10, wherein the load element comprises:
    at least one light-emitting diodes (LED), wherein an anode of the at least one LED is electrically connected to the first end of the p-type transistor, and a cathode of the at least one LED is electrically connected to the low voltage output end of the electronic device.

12. The constant current driving device according to claim 1, wherein the transistor is a metal oxide semiconductor transistor or a bipolar transistor.

13. The constant current driving device according to claim 1, wherein the electronic device is a rectifier, an alternating current source or a voltage source.

14. A constant current driving device for driving a load element, the constant current driving device comprising:
    an electronic device having a first end and a second end, wherein the first end of the electronic device is electrically connected to a first end of the load element;
    a transistor having a first end, a second end, and a control end, wherein the first end of the transistor is electrically connected to a second end of the load element, the second end of the transistor is electrically connected to the second end of the electronic device through an impedance element, and the control end of the transistor is electrically connected to the second end of the electronic device through a first energy storage element;
    a rectifying circuit electrically connected between the first end and the control end of the transistor;
    a current dividing element electrically connected between the control end of the transistor and the second end of the electronic device; and
    a second energy storage element electrically connected between the first end and the second end of the electronic device.

15. The constant current driving device according to claim 14, wherein the rectifying circuit comprises a diode connected between the first end and the control end of the transistor.

16. The constant current driving device according to claim 14, wherein the rectifying circuit comprises a diode and a Zener diode connected in series between the first end and the control end of the transistor.

17. The constant current driving device according to claim 14, wherein the first end of the electronic device is a high voltage output end, the second end of the electronic device is a low voltage output end, the electronic device outputs an output current through the high voltage output end, and the transistor is an n-type transistor.

18. The constant current driving device according to claim 17, wherein the load element comprises:

at least one light-emitting diode (LED), wherein an anode of the at least one LED is electrically connected to the high voltage output end of the electronic device, and a cathode of the at least one LED is electrically connected to the first end of the n-type transistor.

19. The constant current driving device according to claim 14, wherein the electronic device is a rectifier, an alternating current source or a voltage source.

\* \* \* \* \*